United States Patent
Charquet et al.

(10) Patent No.: US 6,863,745 B1
(45) Date of Patent: *Mar. 8, 2005

(54) ZIRCONIUM BASED ALLOY AND METHOD FOR MAKING A COMPONENT FOR A NUCLEAR FUEL ASSEMBLY WITH SAME

(75) Inventors: Daniel Charquet, Ugine (FR); Jean Paul Mardon, Caluire (FR); Jean Senevat, Annecy (FR)

(73) Assignees: Framatome ANP, Courbevoie (FR); Compagnie Europeenne du Zirconium CEZUS, Courbevoie (FR)

( * ) Notice: Subject to any disclaimer, the term of this patent is extended or adjusted under 35 U.S.C. 154(b) by 197 days.

This patent is subject to a terminal disclaimer.

(21) Appl. No.: 10/089,270
(22) PCT Filed: Sep. 28, 2000
(86) PCT No.: PCT/FR00/02680
  § 371 (c)(1),
  (2), (4) Date: Jun. 24, 2002
(87) PCT Pub. No.: WO01/24194
  PCT Pub. Date: Apr. 5, 2001

(30) Foreign Application Priority Data

Sep. 30, 1999 (FR) .............................. 99 12248

(51) Int. Cl.⁷ .............................. C22C 16/00; C22F 1/18
(52) U.S. Cl. ..................... 148/421; 148/672; 420/422
(58) Field of Search ................. 148/421, 672; 420/422

(56) References Cited

U.S. PATENT DOCUMENTS 5,832,050 A  * 11/1998 Rebeyrolle et al. ......... 376/457
6,544,361 B1 *  4/2003 Diz et al. ................... 148/672

FOREIGN PATENT DOCUMENTS

| FR | 2 769 637 | 4/1999 |
| WO | 93 16205 | 8/1993 |
| WO | 97 05628 | 2/1997 |
| WO | 99 50854 | 10/1999 |

OTHER PUBLICATIONS

"ASM Handbook: vol. 2 Properties and Selection: Nonferrous Alloys and Special–Purpose Materials", ASM International, 1990, pp 662–663.*

* cited by examiner

Primary Examiner—George Wyszomierski
Assistant Examiner—Janelle Morillo
(74) Attorney, Agent, or Firm—Kenyon & Kenyon

(57) ABSTRACT

The invention proposes a zirconium-based alloy also containing, by weight, apart from unavoidable impurities, from 0.02 to 1% of iron having from 0.8% to 2.3% of niobium, less than 2000 ppm of tin, less than 2000 ppm of oxygen, less than 100 ppm of carbon, from 5 to 35 ppm of sulphur and from 0.01% to 0.25% in total of chromium and/or vanadium, the ratio R of the niobium content, less 0.5%, to the iron content, optionally supplemented by the chromium and/or vanadium content.

9 Claims, 2 Drawing Sheets

ZIRCONIUM BASED ALLOY AND METHOD FOR MAKING A COMPONENT FOR A NUCLEAR FUEL ASSEMBLY WITH SAME

FIELD OF THE INVENTION

The present invention relates to zirconium-based alloys that are to constitute nuclear fuel assembly components usable in light-water nuclear reactors, such as nuclear fuel rod claddings or assembly guide tubes, or even flat products, such as grid plates.

The invention may be used, although not exclusively, in the field of the manufacture of cladding tubes for fuel rods intended for pressurized-water reactors in which the risks of corrosion are particularly high, and also in the field of strip materials used for structural components of the fuel assemblies of such reactors. The invention also proposes a method for making such components.

BACKGROUND INFORMATION

Patent application PCT WO 99/50 854 proposes a zirconium-based alloy also containing, by weight, apart from unavoidable impurities, from 0.03 to 0.25% in total of iron, on the one hand, and of at least one of the elements of the group constituted by chromium and vanadium, on the other hand, having from 0.8 to 1.3% of niobium, less than 2000 ppm of tin, from 500 to 2000 ppm of oxygen, less than 100 ppm of carbon, from 5 to 35 ppm of sulphur and less than 50 ppm of silicon, the ratio of the iron content, on the one hand, to the chromium or vanadium content, on the other hand, being from 0.5 to 30.

The invention is based on observations made by the inventors in the course of a systematic study of the intermetallic phases and the crystallographic forms of those phases which appear when the relative contents of iron and niobium are varied while the contents of tin, sulphur and oxygen are described in the application mentioned above. It is also based on the observation, made experimentally, that the nature and the crystallographic form of the intermetallic phases containing zirconium, iron and niobium have a major influence on corrosion resistance in various environments.

In particular, it has been found that the presence of compounds Zr (Nb, Fe)$_2$ having a crystalline structure with a hexagonal lattice, and of the phase βNb substantially improves corrosion in the aqueous medium which exists in the majority of pressurized-water reactors.

SUMMARY

The present invention aims especially to provide an alloy which enables components to be obtained wherein the composition may be adapted in an optimum manner to the conditions of use provided for and whose composition is not likely to hamper the manufacturing steps excessively.

To that end, the invention proposes, in particular, a zirconium-based alloy also containing, by weight, apart from unavoidable impurities, from 0.02 to 1% of iron having from 0.8% to 2.3% of niobium, less than 2000 ppm of tin, less than 2000 ppm of oxygen, less than 100 ppm of carbon, from 5 to 35 ppm of sulphur and from 0.01% to 0.25% in total of chromium and/or vanadium, the ratio R of the niobium content, less 0.5%, to the iron content, optionally supplemented by the chromium and/or vanadium content, being higher than 2.5. A ratio exceeding 3 may be used. In order to have a particularly high resistance to uniform corrosion, iron content may not exceed 0.35% as an example.

The choice of the ratio R results from the observation that the phase having a hexagonal lattice does not appear until the relation between the content of Fe (and also of Cr and V if they are present) and the content of Nb is such that R exceeds a threshold which depends slightly on the contents of other elements and on the temperature, but is still higher than 2.5.

The oxygen content may be controlled in such a manner that it is from 1000 to 1600 ppm.

The invention also proposes a method for making a tube according to which:

a bar is produced from a zirconium-based alloy also containing, by weight, apart from unavoidable impurities, from 0.02 to 1% of iron, from 0.8% to 2.3% of niobium, less than 2000 ppm of tin, less than 2000 ppm of oxygen, less than 100 ppm of carbon, from 5 to 35 ppm of sulphur and from 0.01% to 0.25% in total of chromium and/or vanadium, the ratio of the niobium content less 0.5% to the iron content, optionally supplemented by the chromium and/or vanadium content, being higher than 2.5;

the bar is water-quenched after heating at from 1000° C. to 1200° C.;

a blank is extruded after heating at a temperature of from 600° C. to 800° C.;

the blank is cold-rolled in at least two passes to obtain a tube, with intermediate thermal treatments at from 560° C. to 620° C.; and a final thermal treatment is carried out at from 560° C. to 620° C., all of the thermal treatments being carried out in an inert atmosphere or under vacuum.

The final thermal treatment leaves the tube in the recrystallized state, which promotes creep strength, without modifying the nature of the phases.

With the method described above, the βNb phase precipitates and the hexagonal-lattice intermetallic compound of the type Zr (Nb, Fe, Cr, V)$_2$ co-exist.

The alloy may also be used to produce flat elements. Those elements are also used in the recrystallized state and can be manufactured by the following sequence: a blank is produced from a zirconium-based alloy also containing, by weight, in addition to unavoidable impurities, from 0.02 to 1% of iron, from 0.8% to 2.3% of niobium, less than 2000 ppm of tin, less than 2000 ppm of oxygen, less than 100 ppm of carbon, from 5 to 35 ppm of sulphur and less than 0.25% in total of chromium and/or vanadium, the ratio of the niobium content less 0.5% to the iron content, optionally supplemented by the chromium and/or vanadium content, being higher than 2.5, the blank is cold-rolled in at least three passes, with intermediate thermal treatments and a final thermal treatment, one of those intermediate thermal treatments or a preliminary thermal treatment before the first cold-rolling pass being effected for a long period of at least 2 hours at a temperature lower than 600° C., and any thermal treatment following the long treatment and, in particular, the final recrystallization treatment, being effected at a temperature lower than 620° C.

The invention also proposes the application of the above alloy to the production of components of nuclear reactors operating with pressurized water that contains less than 3.5 ppm of lithium.

The existence of the intermetallic compounds, which is due to the presence of iron in a sufficient quantity, and particularly the existence of Zr (Nb, Fe)$_2$, reduces the amount of niobium precipitates in phase β, but also the niobium content of the solid solution and gives good resistance to uniform corrosion at a temperature of 400° C., which is representative of the temperature that prevails in reactors. For a Fe/Nb ratio lower than 0.25, the βNb phase is hardly present.

The presence of chromium and/or vanadium as a very partial replacement for iron and/or niobium in the intermetallic precipitates of the type Zr (Nb, Fe, Cr, V)$_2$ has no marked effect on corrosion at 400° C. The improved corrosion resistance at 400° C. is maintained especially if the sum Fe+Cr is at least 0.03%.

To summarize, an alloy of the above type having a use in the recrystallized state to increase its resistance to the bi-axial creep of tubes and the aptitude for the pressing of sheet metal has characteristics which are adjustable by regulating the iron/niobium ratio but which are still favorable; in particular, it has a high corrosion resistance in an aqueous medium at high temperature, the resistance being all the higher if a high iron content is adopted, this being permitted by a high Nb content.

It also has a high creep strength owing to the presence of tin which remains at a very low content and, owing to doping with oxygen, at a content lower than 2000 ppm, which then has no harmful effect on corrosion resistance.

In current reactors, the ranges given below are particularly valuable as a zirconium-based alloy also containing, by weight, apart from unavoidable impurities: from 1 to 1.8% by weight of niobium, from 0.1 to 0.3% by weight of iron, from 0.15 to 0.20% by weight of tin, from 0.01 to 0.1% by weight of chromium and/or vanadium, from 1000 to 1600 ppm of oxygen, less than 100 ppm of carbon and from 5 to 35 ppm of sulphur.

BRIEF DESCRIPTION OF THE DRAWINGS

The above characteristics and others will emerge more clearly on reading the following description of particular embodiments which are given by way of non-limiting example. The description refers to the drawings which accompany it and in which.

DETAILED DESCRIPTION

Referring to the figures, the C, Si and O$_2$ contents of obtained samples are substantially identical for all of the samples and were lower than the maximum values given above. The tin content was 0.2% and the sulphur content was 10 ppm.

The samples were manufactured by thermo-metallurgical operations at a temperature not exceeding 620° C., any treatment exceeding that value beyond the extrusion operation reducing corrosion resistance at high temperature.

Figure 1:
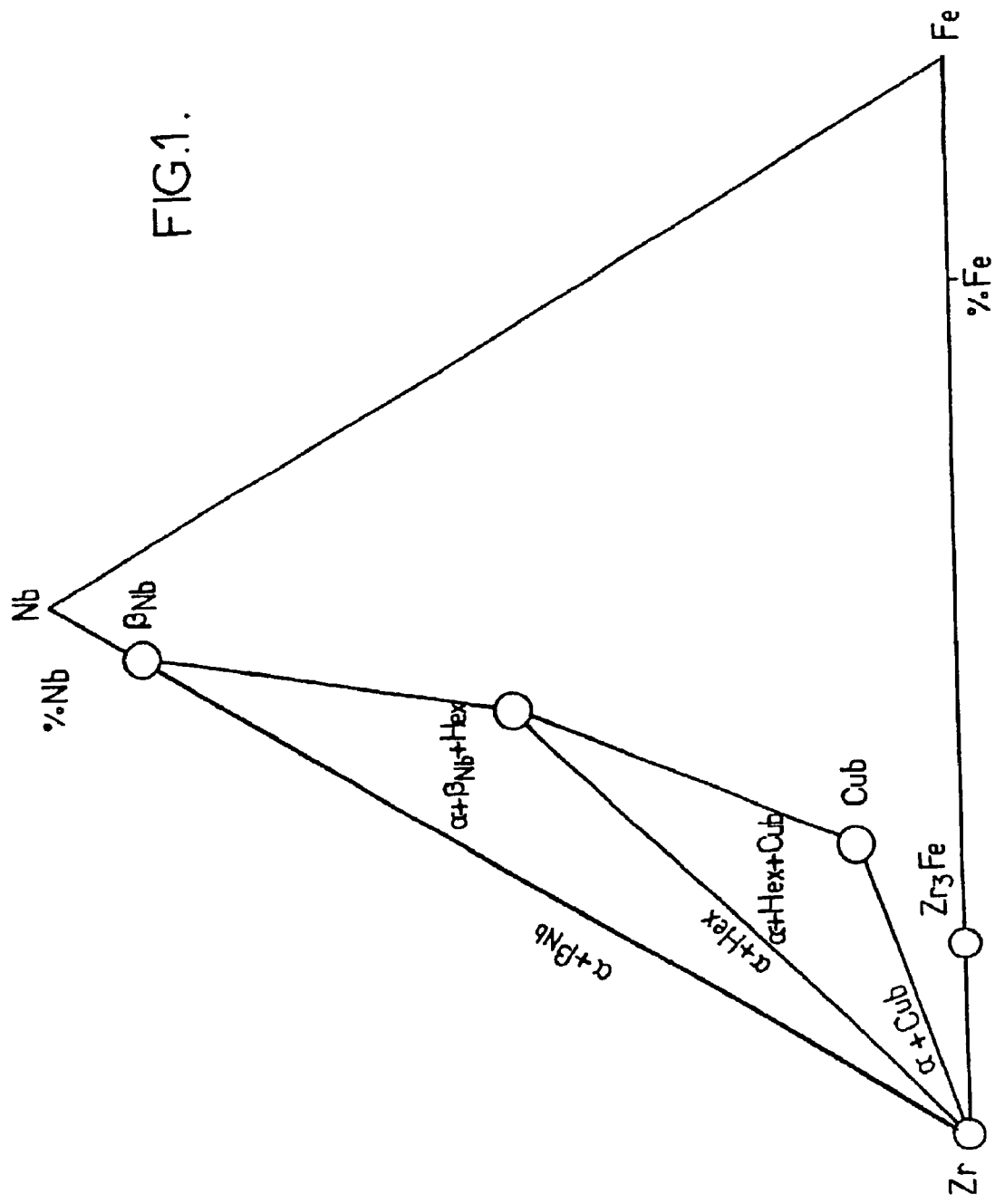
FIG. 1 is a ternary diagram showing the intermetallic compounds and microstructures which appear for various ranges of composition, in the case of a content of 0.2% of tin, at a temperature of from 560° C. to 620° C.
Figure 2:
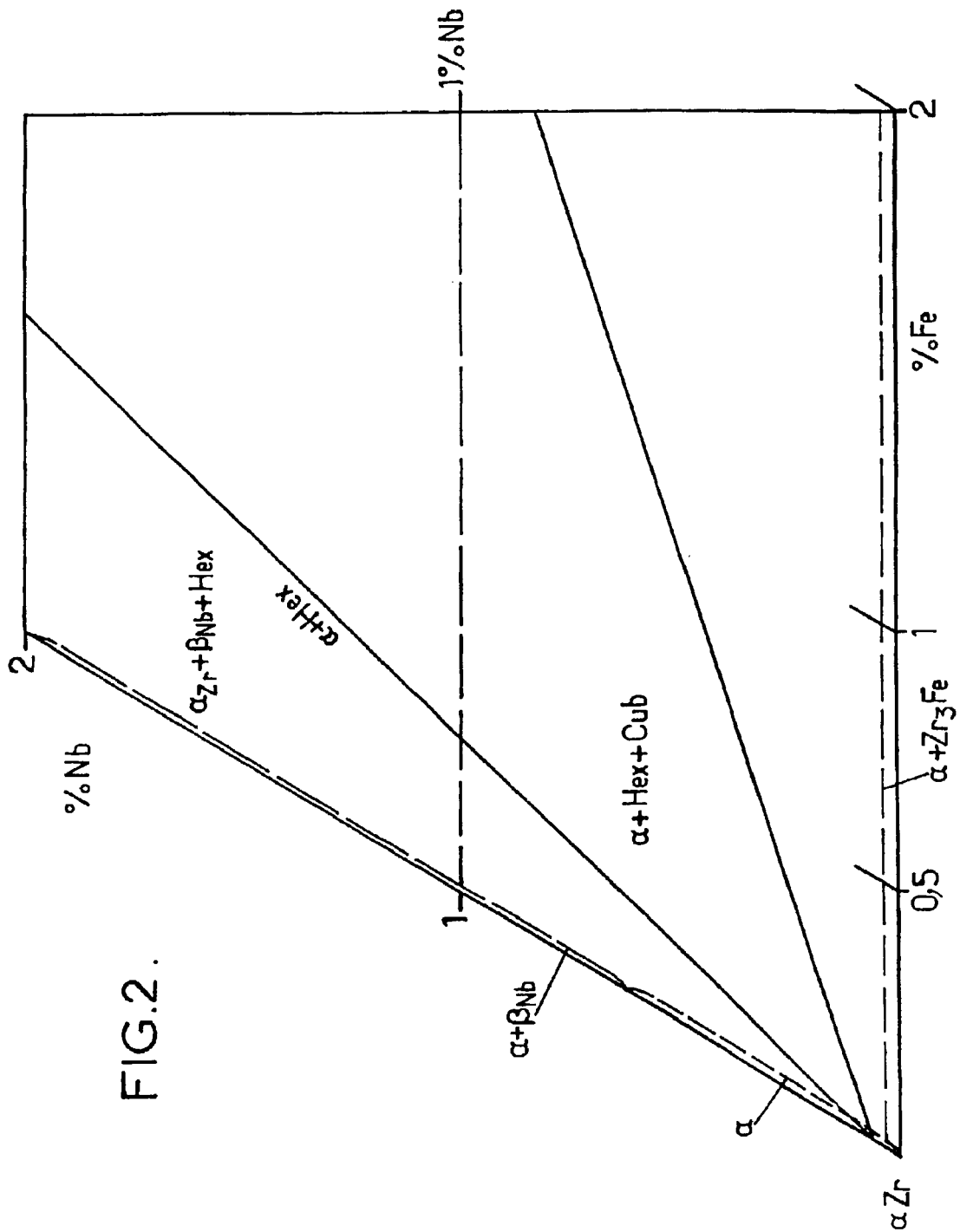
FIG. 2 illustrates a fraction of the diagram on a large scale.

The ternary diagram in FIG. 1 shows, for Fe/Nb ratios lower than approximately 0.3, the existence of a region in which the aZr phase (with the exclusion of the bZr phase which is very detrimental from the point of view of corrosion resistance), the bNb phase precipitates and the intermetallic phase Zr (Nb, Fe)$_2$, which has a hexagonal structure, co-exist.

The compounds, corresponding to a ratio (Nb—0.5%)/Fe+Cr+V higher than a threshold which is always higher than 2.5, as an example, are used when the main phenomenon to be combated is uniform corrosion in high-temperature water having a low lithium content.

For a high Fe/Nb ratio, up to a niobium content of the order of 50%, which is higher by more than one order of magnitude than the contents used, the compound (Zr, Nb)$_4$Fe$_2$, which is face-centered cubic, also appears.

When the conditions of use make it desirable to have intermetallic compounds that have only or predominantly a hexagonal structure, it is found that the result is achieved by adopting a Fe/Nb ratio lower than 0.3, while also respecting the relation (Nb—0.5%)/Fe+Cr+V>2.5.

A precise study of the diagram for the low Fe and Nb contents shows that the Nb content in solid solution develops with the Fe content, with Nb remaining constant.

As soon as the Fe content exceeds 60–70 ppm for the alloy according to the present invention, the hexagonal Zr (Nb, Fe)$_2$ form appears which substitutes the bNb phase for a ratio by weight of Nb/Fe substantially equal to 2.3.

There then appears the face-centered cubic compound (Zr, Nb)$_4$Fe$_2$, corresponding to a Nb/Fe ratio substantially equal to 0.6.

This cubic phase (Zr, Nb)$_4$Fe$_2$ starts to appear for:

1% Nb from 0.29 to 0.44% Fe 1.5% Nb from 0.49 to 0.66% Fe

2% Nb beyond 0.78% Fe.

The diagram illustrates that, by simultaneously increasing the content of Nb and of Fe, a higher density of intermetallics is obtained, which promotes corrosion in an aqueous medium.

The following table shows the influence of the increasing iron content, which does not impair uniform corrosion for an alloy with 1% niobium, the other elements having contents such as described above.

| Fe % by weight | Increase in weight in mg/dm$^2$ 415° C. vapour, 311 days, 105 bar |
|---|---|
| 0.03 | 490 |
| 0.15 | 456 |
| 0.29 | 455 |

What is claimed is:

1. A zirconium based alloy comprising:
   zirconium; and
   in addition to unavoidable impurities, by weight, from 0.02 to 1% iron; from 0.8% to 2.3% niobium, less than 2000 ppm tin, less than 2000 ppm oxygen, less than 100 ppm carbon, from 5 to 35 ppm sulfur and from 0.01% to 0.25% in total of at least one of chromium and vanadium, a ratio (Nb—0.5%)/(Fe+Cr+V) being higher than 2.5.

2. The alloy according to claim 1, wherein the oxygen is from 1000 to 1600 ppm.

3. The alloy according to claim 1, wherein the niobium is from 1 to 1.8% by weight, the iron is from 0.1 to 0.3% by weight, the tin is from 0.15 to 0.20% by weight, the at least one of chromium and vanadium is from 0.01 to 0.1% by weight, the oxygen is from 1000 to 1600 ppm, the carbon is less than 100 ppm and the sulfur is from 5 to 35 ppm.

4. A tube comprising:
   a tubular arranged zirconium-based alloy wherein the alloy comprises:

zirconium; and in addition to unavoidable impurities, by weight, from 0.02 to 1% iron; from 0.8 to 2.3% niobium, less than 2000 ppm tin, less than 2000 ppm oxygen, less than 100 ppm carbon, from 5 to 35 ppm sulfur and from 0.01% to 0.25% in total of at least one of chromium and vanadium, a ratio of (Nb—0.5%)/(Fe+Cr+V) being higher than 2.5 in a recrystallized state.

5. A flat product comprising:

a flat arranged zirconium based alloy wherein the alloy comprises:

zirconium; and in addition to unavoidable impurities, by weight, from 0.02 to 1% iron; from 0.8% to 2.3% niobium, less than 2000 ppm tin, less than 2000 ppm oxygen, less than 100 ppm carbon, from 5 to 35 ppm sulfur and from 0.01% to 0.25% in total of at least one of chromium and vanadium, a ratio (Nb—0.5%)/(Fe+Cr+V) being higher than 2.5 in a recrystallized state.

6. A method of using a component comprising:

providing the component made of an alloy comprising:

zirconium; and in addition to unavoidable impurities, by weight, from 0.02 to 1% iron; from 0.8% to 2.3% niobium, less than 2000 ppm tin, less than 2000 ppm oxygen, less than 100 ppm carbon, from 5 to 35 ppm sulfur and from 0.01% to 0.25% in total of at least one of chromium and vanadium, a ratio of (Nb—0.5%)/(Fe+Cr+V) being higher than 2.5 in a recrystallized state; and utilizing the component in a pressurized water reactor, wherein water initially contains less than 3.5 ppm of lithium.

7. The alloy according to claim 1, wherein the ratio is higher than 3.

8. The alloy according to claim 1, wherein the iron content does not exceed 0.35%.

9. A method for making a tube to constitute at least one of all and an external portion of at least one of nuclear fuel rod cladding and a guide tube for a nuclear fuel assembly comprising:

producing a bar from a zirconium-based alloy also containing by weight apart from unavoidable impurities, by weight, from 0.02 to 1% iron; from 0.8% to 2.3% niobium, less than 2000 ppm tin, less than 2000 ppm oxygen, less than 100 ppm carbon, from 5 to 35 ppm sulfur and from 0.01% to 0.25% in total of at least one of chromium and vanadium, a ratio (Nb—0.5%)/(Fe+Cr+V) being higher than 2.5;

water-quenching the bar after heating at from 1000° C. to 1200° C.;

extruding a blank after heating at from 600° C. to 800° C.;

cold rolling the blank in at least two passes to obtain a tube, with intermediate thermal treatments at from 560 C to 620 C; and carrying out a final thermal treatment at from 560 C to 620 C, all of the thermal treatments being carried out in at least one of an inert atmosphere and under vacuum.

* * * * *